US007729692B2

(12) United States Patent
Oka et al.

(10) Patent No.: US 7,729,692 B2
(45) Date of Patent: Jun. 1, 2010

(54) INSPECTION APPARATUS, ANALYSIS DISPLAY APPARATUS, INSPECTION SYSTEM AND INSPECTION METHOD

(75) Inventors: Hitoshi Oka, Kanagawa (JP); Yukinori Amao, Kanagawa (JP); Yojiro Hiranuma, Tokyo (JP); Taiji Katsube, Tokyo (JP)

(73) Assignees: Panasonic Corporation, Osaka (JP); Agilent Technologies, Inc., Osaka (JP)

( * ) Notice: Subject to any disclaimer, the term of this patent is extended or adjusted under 35 U.S.C. 154(b) by 755 days.

(21) Appl. No.: 11/579,957

(22) PCT Filed: Apr. 28, 2005

(86) PCT No.: PCT/JP2005/008197

§ 371 (c)(1),
(2), (4) Date: Nov. 9, 2006

(87) PCT Pub. No.: WO2005/109685

PCT Pub. Date: Nov. 17, 2005

(65) Prior Publication Data

US 2008/0191708 A1    Aug. 14, 2008

(30) Foreign Application Priority Data

May 12, 2004    (JP)    .............................. 2004-142094

(51) Int. Cl.
*G01R 31/02*    (2006.01)
(52) U.S. Cl. ........................ 455/423; 455/424; 455/425; 702/57; 702/58; 702/59; 324/537

(58) Field of Classification Search ................. 455/423, 455/226.4, 424, 425; 324/537; 375/224; 702/57, 58, 59
See application file for complete search history.

(56) References Cited

U.S. PATENT DOCUMENTS 6,308,065 B1 * 10/2001 Molinari et al. ............. 455/424
2004/0132457 A1 * 7/2004 Sanders et al. .............. 455/450

FOREIGN PATENT DOCUMENTS

JP    2003-283481    10/2003
JP    2004072665    3/2004

OTHER PUBLICATIONS

PCT International Search Report dated Jul. 26, 2005.

* cited by examiner

*Primary Examiner*—Charles N Appiah
*Assistant Examiner*—William F Rideout
(74) *Attorney, Agent, or Firm*—Dickinson Wright PLLC

(57)    ABSTRACT

There is provided an inspection system capable of easily performing inspection of a radio section under an actual environment and enabling a user to easily identify a trouble. In this system, an analysis/display device (400) analyzes the data outputted from an inspection device (200, 300) and extracts a radio parameter. By using the radio parameter extracted from the data obtained by inspection of a cabled section, an inspection device (100) inspects the state of radio communication between a communication terminal device (50) and a base station device (150). The analysis/display device (400) aligns the cabled message and the radio message obtained by analyzing the data outputted from the inspection devices (100, 200, 300) in time series or in sequence of calls and displays them.

6 Claims, 12 Drawing Sheets

| TIME | CALL A(1) DATA (MESSAGE) |
|---|---|
| TIME | CALL B(1) DATA (MESSAGE) |
| TIME | CALL A(2) DATA (MESSAGE) |
| ⋮ | ⋮ |
| TIME | CALL C(1) DATA (MESSAGE) |
| TIME | CALL A(3) DATA (MESSAGE) |

| TIME | CALL A(1) DATA (MESSAGE) |
|---|---|
| TIME | CALL A(2) DATA (MESSAGE) |
| ⋮ | ⋮ |
| TIME | CALL A(N) DATA (MESSAGE) |

| TIME | CALL B(1) DATA (MESSAGE) |
|---|---|
| ⋮ | ⋮ |

EXAMPLE OF OUTPUT LIST

| | CHANNEL NAME | SPREADING FACTOR | SCRAMBLING CODE | ... |
|---|---|---|---|---|
| TIME: | DCH1, | SF64, | 1604, | UPLINK |
| | DCH2, | SF256, | 56, | DOWNLINK |
| | RACH, | SF128, | 56, | DOWNLINK |
| TIME: | DCH1, | SF128, | 1604, | UPLINK |
| | RACH, | SF256, | 57, | DOWNLINK |

⇧ PARAMETERS EXTRACTED FROM A(2)

⇧ PARAMETERS EXTRACTED FROM A(4)

FIG.8

| No | Iub |
|---|---|
| 1 | RRC Connection Request→ |
| 2 | ←Radio Link Setup Request |
| 3 | Radio Link Setup Response→ |
| 4 | ←ALCAP ERQ |
| 5 | ALCAP ECF→ |
| 6 | ←Downlink Synchronization |
| 7 | Uplink Synchronization→ |
| 8 | ←RRC Connection Setup |
| 9 | ??? |

FIG.11

| No | Uu | Iub |
|---|---|---|
| 1 | RRC Connection Request→ | RRC Connection Request→ |
| 2 | | ←Radio Link Setup Request |
| 3 | | Radio Link Setup Response→ |
| 4 | | ←ALCAP ERQ |
| 5 | | ALCAP ECF→ |
| 6 | | ←Downlink Synchronization |
| 7 | | Uplink Synchronization→ |
| 8 | ←RRC Connection Setup | ←RRC Connection Setup |
| 9 | RRC Connection Setup Complete→ | ??? |

FIG.12

| No | Uu | Iub |
|---|---|---|
| 00:01 | RRC Connection Request→ | |
| 00:02 | | RRC Connection Request→ |
| 00:10 | | ←Radio Link Setup Request |
| 00:12 | | Radio Link Setup Response→ |
| 00:13 | | ←ALCAP ERQ |
| 00:14 | | ALCAP ECF→ |
| 00:15 | | ←Downlink Synchronization |
| 00:16 | | Uplink Synchronization→ |
| 00:17 | | ←RRC Connection Setup |
| 03:00 | | ←RRC Connection Setup |
| 05:00 | | ←RRC Connection Setup |
| 08:00 | | ←RRC Connection Release |
| 10:00 | ←RRC Connection Setup | |
| 10:05 | RRC Connection Setup Complete→ | ??? |

FIG.14

INSPECTION APPARATUS, ANALYSIS DISPLAY APPARATUS, INSPECTION SYSTEM AND INSPECTION METHOD

TECHNICAL FIELD

The present invention relates to a radio section inspection apparatus, analysis/display apparatus that analyzes and displays inspection results of radio and wired sections and an inspection system including these apparatuses.

BACKGROUND ART

At the present day when radio communication system has been developed, it is necessary to perform maintenance work efficiently when a failure occurs and for this purpose, it is important to inspect information transmitted/received among apparatuses and specify the failure in early stages.

Conventional inspections regarding (1) a radio section between a communication terminal apparatus and a base station apparatus (Uu), (2) a wired section between the base station apparatus and a radio network control system (Iu) and (3) a wired section between the radio network control system and a core network (Iub) have been carried out individually.

In the inspection of the radio section by (1), the inspection apparatus receives a signal transmitted from the communication terminal apparatus or the base station apparatus, demodulates and decodes the signal using radio parameters, analyzes the acquired data and displays messages transmitted/received among the apparatuses. In this way, the user can specify which of the base station apparatus or the communication terminal apparatus is the cause of a failure occurred in the radio section (for example, Patent Document 1).

In a conventional radio section inspection apparatus, radio parameters are acquired using any one of "A. a method of designating user-designated radio parameters for the inspection apparatus" and "B. a method whereby the inspection apparatus monitors signals transmitted/received among communication apparatuses."

Patent Document 1: Japanese Patent Application Laid-Open No. 2004-72665

DISCLOSURE OF INVENTION

Problems to be Solved by the Invention

However, while it is possible for the user to designate radio parameters for the inspection apparatus under an experiment environment that is intentionally created such as a laboratory, it is not possible for the user to know information that is automatically sequenced by the base station apparatus in an actual environment, and therefore the user cannot designate the radio parameters for the inspection apparatus.

Furthermore, according to the method whereby the inspection apparatus monitors signals transmitted/received among communication apparatuses, the position where the inspection apparatus exists is different from that of the base station apparatus or the communication terminal apparatus. Therefore, a signal transmitted by the base station apparatus to the communication terminal apparatus cannot be received by the inspection apparatus under the same condition as that of the communication terminal apparatus, and there is a possibility that radio parameters may be estimated incorrectly. Furthermore, when an inspection is carried out through a CDMA scheme communication, it is necessary to estimate spreading codes through despreading processing to acquire radio parameters and it takes time to estimate the parameters.

Furthermore, through the inspection of the wired section by (2), it is also possible to detect that a failure has occurred in the radio section, but transmission/reception of information to complete between the base station apparatus and the communication terminal apparatus is not recorded in a log of a higher layer. Therefore, the user cannot specify which of the base station apparatus or the communication terminal apparatus is the cause of the failure occurred in the radio section.

It is therefore an object of the present invention to provide an inspection apparatus, analysis/display apparatus and inspection system capable of easily inspecting a radio section in an actual environment and allowing the user to easily specify a failure.

Means for Solving the Problem

In order to solve the above described problems, an inspection apparatus according to the present invention is an inspection apparatus that inspects a radio section between a communication terminal apparatus and a base station apparatus and adopts a configuration comprising a radio parameter acquisition part that acquires radio parameters corresponding to a communication terminal apparatus to be inspected acquired through an inspection of the wired section, a radio parameter selector that selects radio parameters corresponding to a receiving time of a signal transmitted from the communication terminal apparatus to be inspected or the base station apparatus, a demodulator that demodulates a signal transmitted from the communication terminal apparatus to be inspected or the base station apparatus using the selected radio parameters and a decoder that decodes the signal demodulated by the demodulator using the selected radio parameters and acquires transport channel data. Furthermore, an analysis/display apparatus of the present invention adopts a configuration comprising an analyzer that analyzes the transport channel data decoded by the inspection apparatus and converts the transport channel data to message data and a display that displays the message data.

Furthermore, the inspection system according to the present invention adopts a configuration comprising a wired section inspection apparatus that inspects a wired section and acquires transport channel data, a radio section inspection apparatus that inspects a radio section using radio parameters corresponding to a communication terminal apparatus to be inspected acquired through the inspection of the wired section and acquires transport channel data and an analysis/display apparatus that analyzes the transport channel data acquired by the two inspection apparatuses and displays the acquired message data arranged in a time series or in a sequence for each call.

ADVANTAGEOUS EFFECT OF THE INVENTION

According to the present invention, it is possible to acquire radio parameters reliably and in a short time and easily inspect a radio section in an actual environment. Moreover, it is possible for the user to easily specify a failure by displaying wired messages and radio messages arranged in a time series or in a sequence for each call.

BRIEF DESCRIPTION OF DRAWINGS

FIG. 5 shows an example of message data inputted to the analysis/display apparatus according to the embodiment of the present invention;

FIG. 6 shows an example of message data inputted to the analysis/display apparatus according to the embodiment of the present invention;

FIG. 8 shows an example of message data inputted to the analysis/display apparatus according to the embodiment of the present invention;

FIG. 11 shows a sequence diagram showing only messages in a conventional wired section (Iub);

FIG. 12 is a sequence diagram displayed on the analysis/display apparatus according to the embodiment of the present invention;

FIG. 14 is a sequence diagram displayed on the analysis/display apparatus according to the embodiment of the present invention.

BEST MODE FOR CARRYING OUT THE INVENTION

The present inventors have conceived the present invention noting that signals transmitted/received in a radio section are reliably recorded in a network and that an inspection apparatus which inspects a wired section can extract information recorded in the network.

That is, an essence of the present invention is to extract radio parameters from data acquired through an inspection of a wired section and inspect a radio section using the extracted radio parameters. Moreover, another essence of the present invention is to display wired messages and radio messages acquired through an inspection arranged in a time series or in a sequence for each call.

An embodiment of the present invention will be explained below in detail with reference to the accompanying drawings. This embodiment will explain a case where a communication system to be inspected performs a radio communication according to a W-CDMA scheme in a radio section. In this case, radio parameters include a channel type used in each radio layer, scrambling code, channelization code, spreading factor, time at which a slot format message is acquired or the like.

Embodiment

Figure 1:
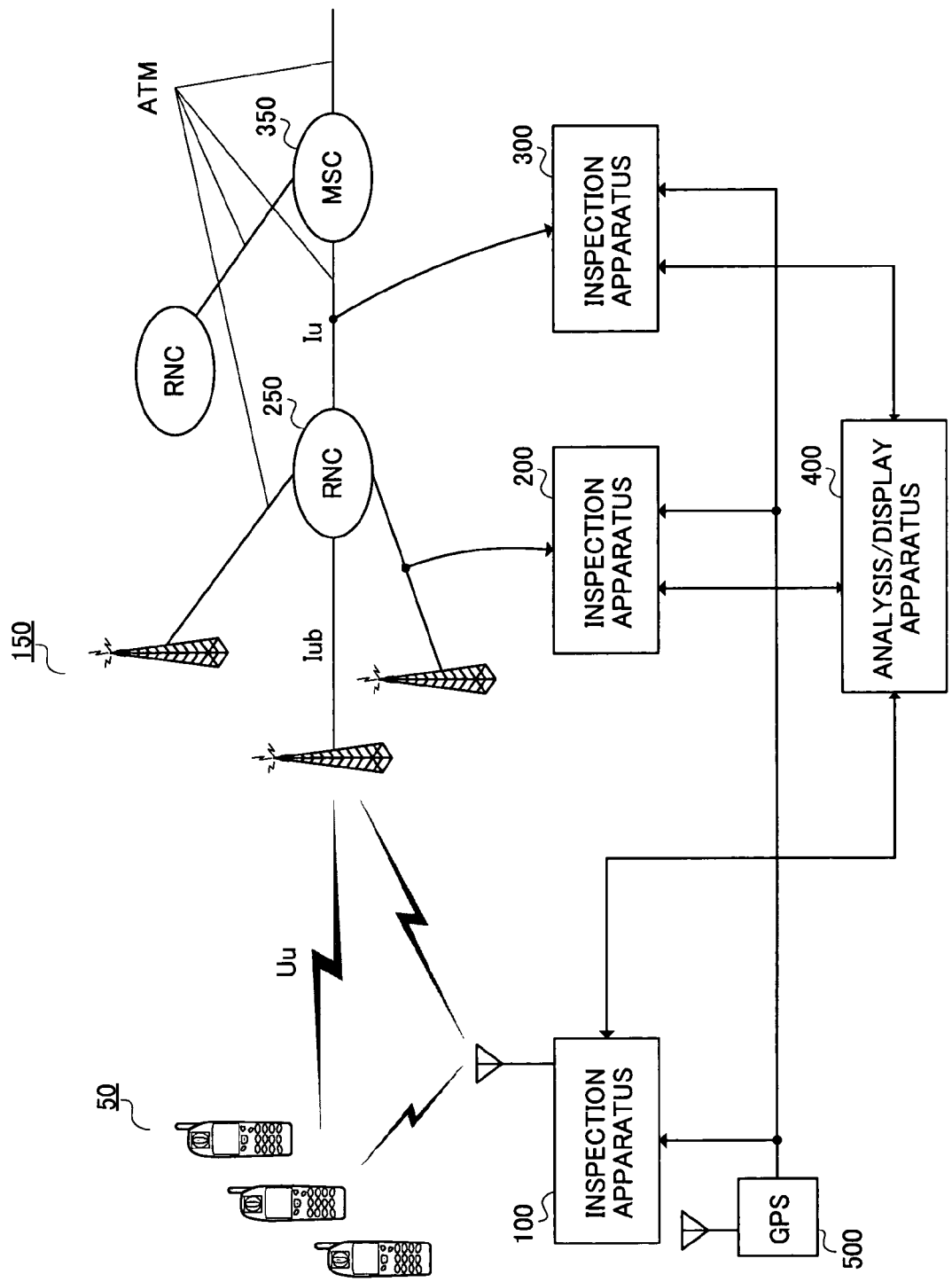
FIG. 1 shows the configuration of a monitoring system according to an embodiment of the present invention.

FIG. 1 shows the configuration of a monitoring system according to an embodiment of the present invention.

In FIG. 1, inspection apparatus 100 is the inspection apparatus according to this embodiment and inspects a radio communication state between communication terminal apparatus 50 and base station apparatus 150 using radio parameters extracted from data acquired through an inspection of a wired section. Inspection apparatus 200 inspects a wired communication state between base station apparatus 150 and radio network controller (RNC) 250. Inspection apparatus 300 inspects the wired communication state between radio network controller 250 and mobile switching center (MSC) 350. Analysis/display apparatus 400 analyzes data outputted from inspection apparatuses 100, 200 and 300, and displays wired messages and radio messages arranged in a time series or in a sequence for each call. GPS receiving apparatus 500 receives GPS information about ephemeris data or the like transmitted from a GPS satellite, measures the position of the own apparatus and outputs time information indicating the time at which GPS information is received and position information which is a measurement result to inspection apparatuses 100, 200 and 300.

Figure 2:
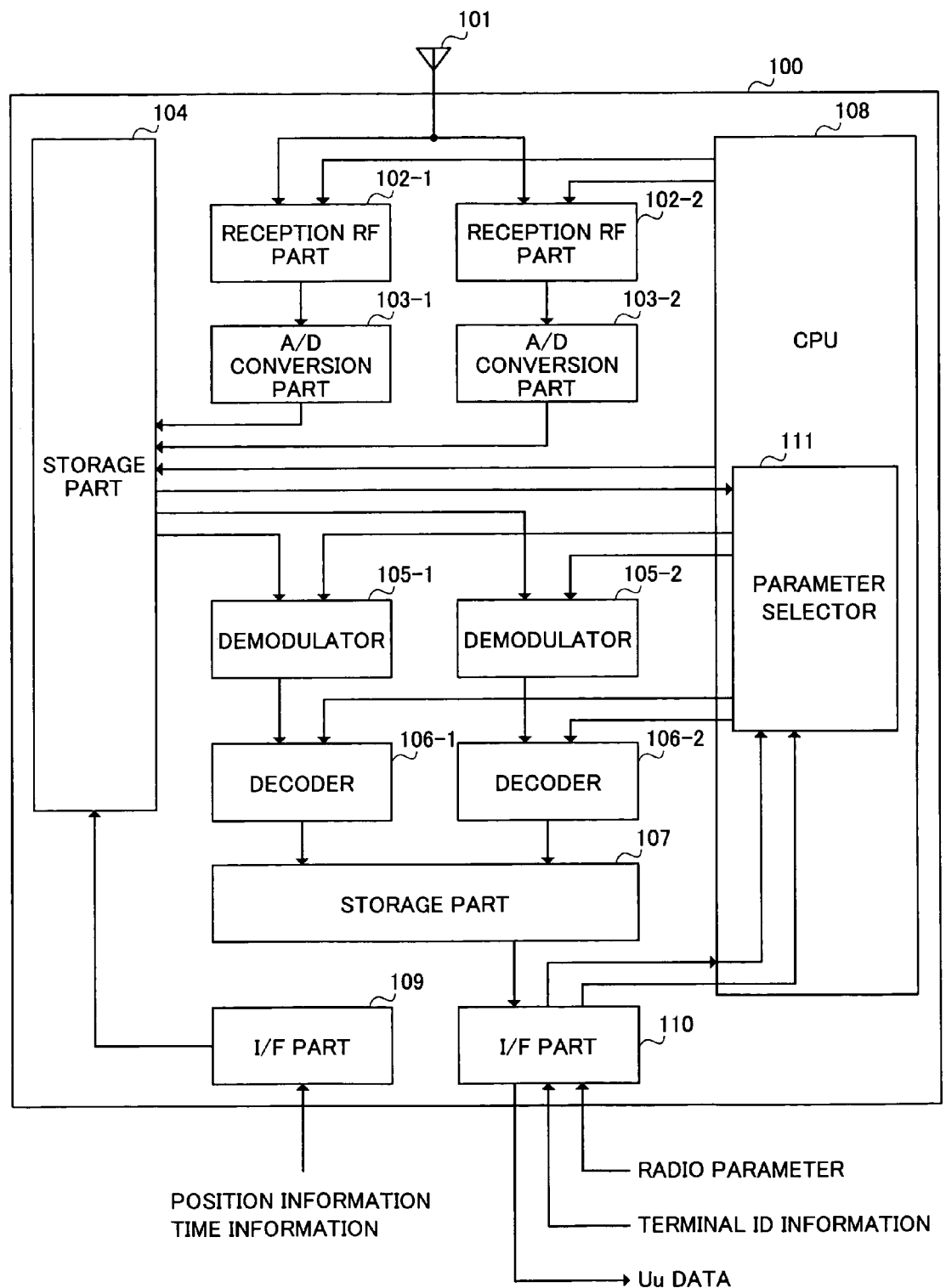
FIG. 2 is a block diagram showing the configuration of a radio section inspection apparatus according to the embodiment of the present invention.

FIG. 2 is a block diagram showing the internal configuration of inspection apparatus 100 according to this embodiment.

Inspection apparatus 100 is mainly constructed of reception antenna 101, reception RF parts 102-1 and 102-2, A/D conversion parts 103-1 and 103-2, storage part 104, demodulators 105-1 and 105-2, decoders 106-1 and 106-2, storage part 107, CPU 108, I/F part 109 and I/F part 110. CPU 108 has parameter selector 111.

A signal transmitted from communication terminal apparatus 50 or base station apparatus 150 is inputted to reception antenna 101. Position information and time information outputted from GPS reception apparatus 500 are inputted to I/F part 109. Terminal ID information indicating a communication terminal apparatus to be inspected instructed from the user, information indicating radio parameters (hereinafter, referred to as "radio parameter information") outputted from analysis/display apparatus 400 are inputted to I/F part 110. The radio parameter information consists of radio parameters listed in correspondence with time information and will be described in detail later.

Reception RF part 102-1 performs frequency conversion at a carrier frequency of an uplink to be inspected instructed from CPU 108 on a radio signal received by reception antenna 101 and outputs a baseband signal to A/D conversion part 103-1. Reception RF part 102-2 performs frequency conversion at a carrier frequency of a downlink to be inspected instructed from CPU 108 on a radio signal received by reception antenna 101 and outputs a baseband signal to A/D conversion part 103-2.

A/D conversion parts 103-1 and 103-2 perform A/D (analog/digital) conversion processing on the baseband signals outputted from corresponding reception RF parts 102-1 and 102-2, and output the digitized signals to storage part 104. Storage part 104 stores digital data (hereinafter, referred to as "I/F data") outputted from A/D conversion parts 103-1 and 103-2 associated with the time information inputted through I/F part 109.

Demodulator 105-1 performs demodulation processing including despreading processing on the I/F data stored in storage part 104 using radio parameters of the uplink outputted from parameter selector 111 and outputs the demodulated symbol data to decoder 106-1. Demodulator 105-2 performs demodulation processing including despreading processing on the I/F data stored in storage part 104 using radio parameters of the downlink outputted from parameter selector 111 and outputs the demodulated symbol data to decoder 106-2.

Radio parameters used for demodulation include a channel type, scrambling code, channelization code and spreading factor or the like. Furthermore, a physical channel for performing demodulation as the uplink includes a physical random access channel (PRACH) and dedicated physical channel (DPCH) or the like channel, while a downlink includes primary common control physical channel (P-CCPCH), secondary common control physical channel (S-CCPCH), dedicated physical channel (DPCH), access indicator channel (AICH) and paging indicator channel (PICH) or the like.

Decoder 106-1 performs decoding processing such as error correction decoding on the symbol data outputted from demodulator 105-1 using the radio parameters of the uplink and outputs transport channel data acquired through the decoding to storage part 107. Decoder 106-2 performs decoding processing of error correction decoding on the symbol data outputted from demodulator 105-2 using the radio parameters of the downlink and outputs transport channel data acquired through the decoding to storage part 107. Storage part 107 stores the transport channel data (hereinafter, referred to as "Uu data") outputted from decoders 106-1 and 106-2. Radio parameters used for decoding include a type of decoding, block size or the like. Furthermore, the transport channel for performing decoding as the uplink includes a random access channel (RACH) and dedicated channel (DCH) or the like, while the downlink includes a broadcast channel (BCH), paging channel (PCH), forward access channel (FACH) and dedicated channel (DCH) or the like. Furthermore, the logical channel for performing decoding as the uplink includes a common control channel (CCCH) and dedicated control channel (DCCH) or the like, and broadcast control channel (BCCH), paging control channel (PCCH), common control channel (CCCH) and dedicated control channel (DCCH) or the like.

CPU 108 instructs reception RF parts 102-1 and 102-2 on required carrier frequencies. Furthermore, CPU 108 causes storage part 104 to output the I/F data of the communication terminal apparatus corresponding to the terminal ID information to demodulators 105-1 and 105-2. Furthermore, CPU 108 causes storage part 107 to output the Uu data of the communication terminal apparatus corresponding to the terminal ID information together with the time information to analysis/display apparatus 400 through I/F part 110.

Parameter selector 111 inside CPU 108 compares the time information associated with the I/F data stored in storage part 104 with the time information of the radio parameter information when starting to reproduce the I/F data stored in storage part 104. Parameter selector 111 selects radio parameters whereby two pieces of time information match and outputs the selected radio parameters to demodulators 105-1 and 105-2, and decoders 106-1 and 106-2 at timing indicated by the time information. As a result, it is possible to output appropriate radio parameters to demodulators 105-1 and 105-2, and decoders 106-1 and 106-2 according to the demodulation/decoding timing, and therefore it is possible to acquire the Uu data of the communication terminal apparatus to be inspected instructed by a user.

This is the explanation of each configuration of inspection apparatus 100 in the radio section according to this embodiment.

Figure 3:
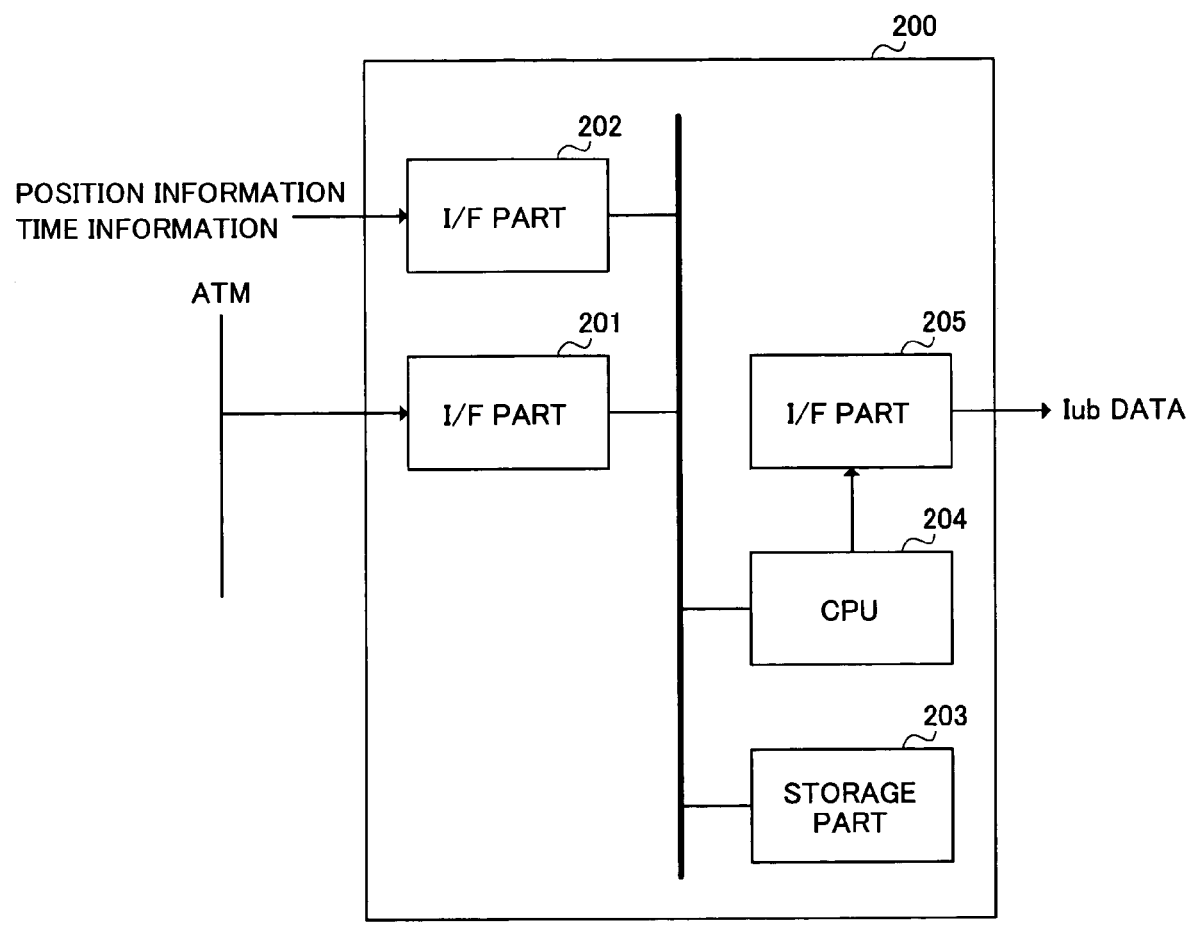
FIG. 3 is a block diagram showing the configuration of a wired section inspection apparatus according to the embodiment of the present invention.

Next, the configuration of inspection apparatus 200 in the wired section will be explained using a block diagram in FIG. 3.

Inspection apparatus 200 is mainly constructed of I/F part 201, I/F part 202, storage part 203, CPU 204 and I/F part 205.

Transport channel data (hereinafter, referred to as "Iub data") exchanged between base station apparatus 150 and RNC 250 on an ATM is inputted to I/F part 201. The position information and time information outputted from GPS receiving apparatus 500 are inputted to I/F part 202.

Storage part 203 stores the Iub data outputted from I/F part 201 associated with the time information inputted through I/F part 202.

CPU 204 outputs the Iub data and the time information stored in storage part 203 to analysis/display apparatus 400 through I/F part 205 based on an instruction from the user.

This is the explanation of each configuration of inspection apparatus 200 in the wired section. The configuration of inspection apparatus 300 in the wired section is identical to that of inspection apparatus 200 with the only difference in that the transport channel data (hereinafter, referred to as "Iu data") exchanged between RNC 250 and MSC 350 on an ATM is inputted instead of the Iub data, and therefore detailed explanation thereof will be omitted.

Figure 4:
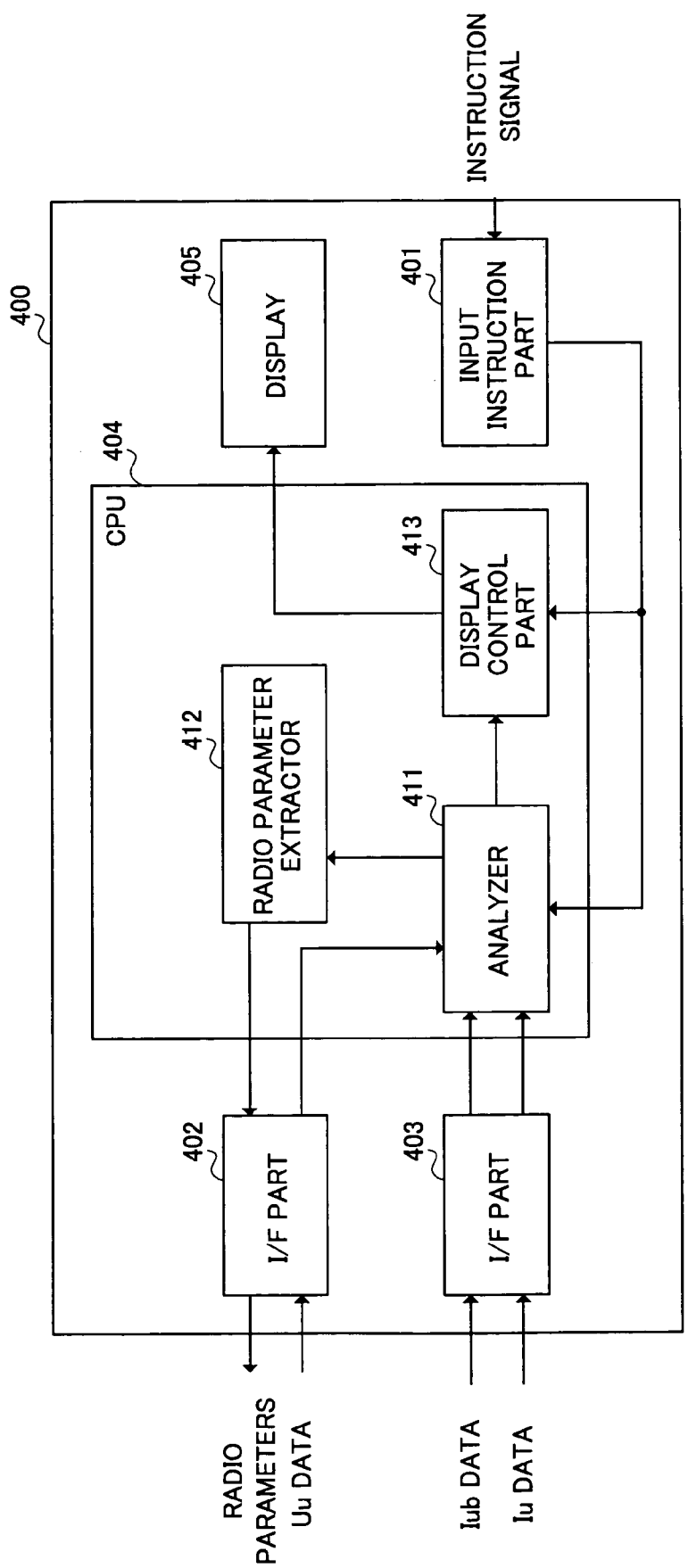
FIG. 4 is a block diagram showing the configuration of an analysis/display apparatus according to the embodiment of the present invention.

Next, the configuration of analysis/display apparatus 400 according to this embodiment will be explained using a block diagram in FIG. 4.

Analysis/display apparatus 400 is mainly constructed of input instruction part 401, I/F part 402, I/F part 403, CPU 404 and display 405. CPU 404 has analyzer 411, radio parameter extractor 412 and display control part 413.

A signal (hereinafter, referred to as "instruction signal") indicating an instruction from the user is inputted to input instruction part 401. The Uu data outputted from inspection apparatus 100 is inputted to I/F part 402. The Iub data outputted from inspection apparatus 200 and the Iu data outputted from inspection apparatus 300 are inputted to I/F part 403.

Analyzer 411 inside CPU 404 performs each analysis of MAC, RLC and RRC on the Iub data and Iu data and converts a binary string to message data which is easy to understand for the user and outputs the message data corresponding to the communication terminal apparatus to be inspected instructed by the instruction signal outputted from input instruction part 401 to radio parameter extractor 412 and display control part 413. Furthermore, analyzer 411 performs each analysis of MAC, RLC and RRC on the Uu data, converts the Uu data to message data and outputs the message data to display control part 413. More specific processing contents of analyzer 411 will be described later.

Radio parameter extractor 412 inside CPU 404 extracts radio parameters necessary to demodulate and decode Uu data from the message of the Iub data or the Iu data outputted from analyzer 411, creates radio parameter information consisting of the extracted radio parameters listed in correspondence with the time information and outputs the radio parameter information to inspection apparatus 100 through I/F part 402. More specific processing contents of radio parameter extractor 412 will be described later.

Display control part 413 inside CPU 404 arranges message data in a time series or in a sequence for each call and displays the message data on display 405 based on the instruction signal outputted from input instruction part 401.

This is the explanation of each configuration of analysis/display apparatus 400 according to this embodiment.

Next, more specific processing contents of analyzer 411 and radio parameter extractor 412 will be explained.

First, analyzer 411 performs each analysis of MAC, RLC and RRC on the Iub data and Iu data and converts the binary string to message data which is easy to understand for the user. At this time, data of calls A, B and C are mixed as shown in FIG. 5. Analyzer 411 then performs processing of arranging message data for each call as shown in FIG. 6. Analyzer 411 outputs message data group 601 corresponding to the communication terminal apparatus (e.g., call A) to be inspected instructed by the instruction signal outputted from input instruction part 401 to radio parameter extractor 412 and display control part 413. This message data group 601 is associated with the time information. Analyzer 411 also performs similar processing on the Uu data and outputs a message data group to display control part 413.

Figure 7:
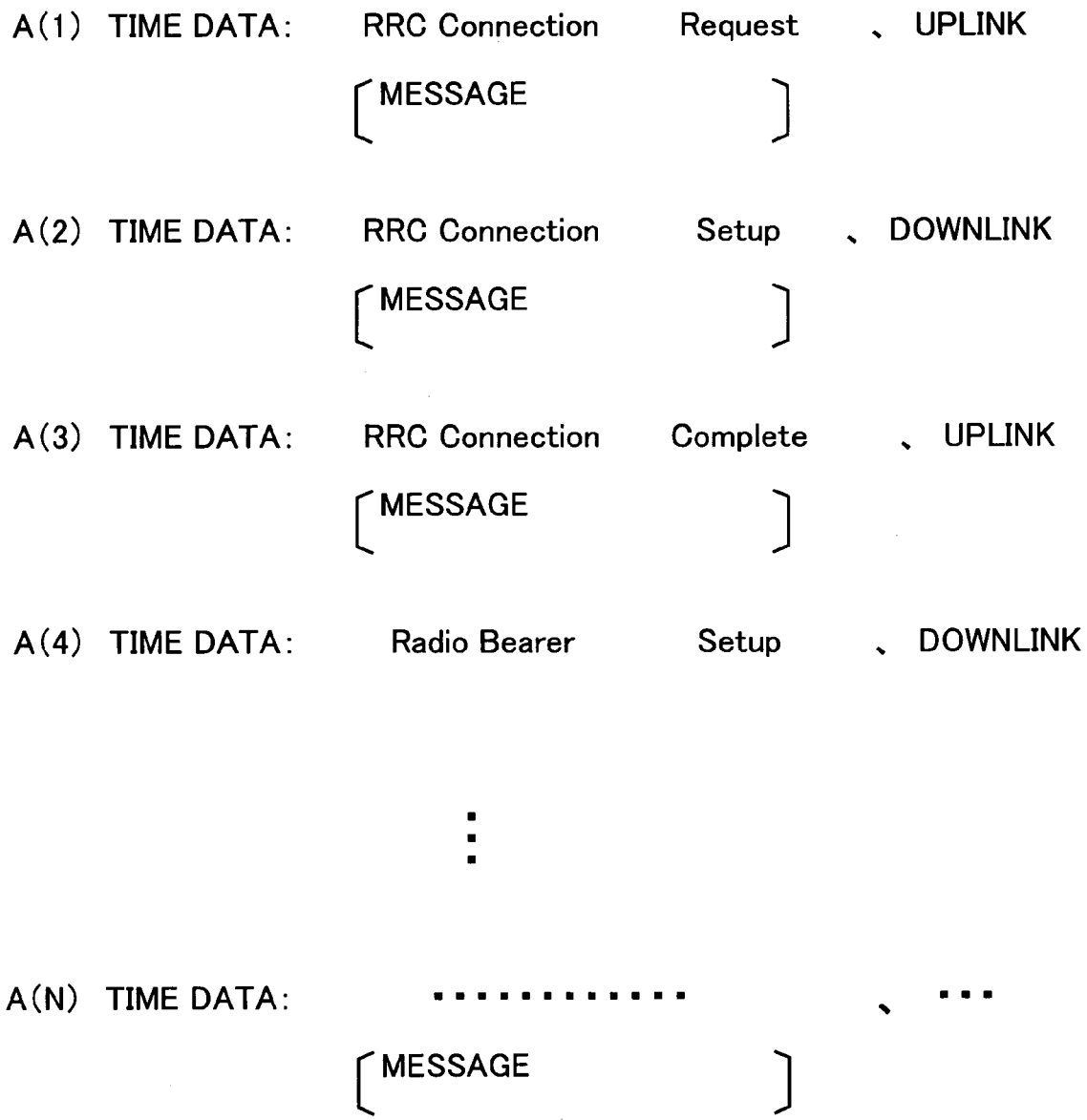
FIG. 7 shows an example of message data inputted to the analysis/display apparatus according to the embodiment of the present invention.

FIG. 7 shows message data group 601 in detail. Radio parameter extractor 412 selects message data including radio parameters (A(2) and A(4) in FIG. 7) from the message group shown in FIG. 7, extracts radio parameters necessary to demodulate and decode Uu data from the selected message data and creates radio parameter information consisting of the extracted radio parameters listed in correspondence with the time information. FIG. 8 shows an example of the radio parameter information. Radio parameter extractor 412 outputs the radio parameter information as shown in FIG. 8 to inspection apparatus 100 through I/F part 402.

Figure 9:
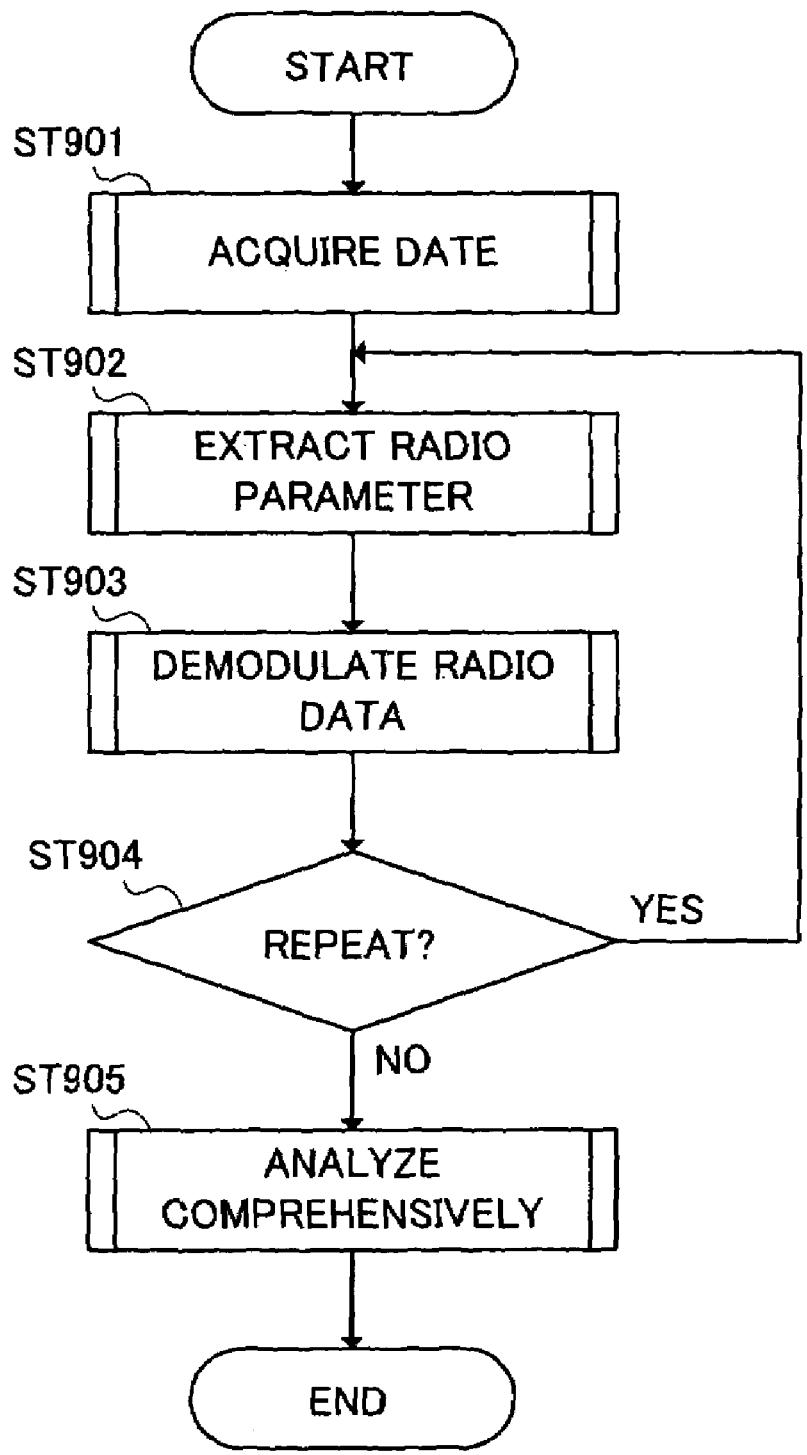
FIG. 9 is a flow chart showing an operation procedure of the monitoring system according to the embodiment of the present invention.

Next, the operation procedure of the monitoring system according to this embodiment will be explained using a flow chart in FIG. 9.

First, inspection apparatus 100 receives uplink, downlink radio signals transmitted/received in the radio section (Uu), performs radio processing and A/D conversion processing on the received signals and stores I/F data as data acquisition processing (ST901). Furthermore, inspection apparatuses 200 and 300 input the data exchanged on the ATM in the wired section (Iub and Iu) and analysis/display apparatus 400 stores the Iub data and Iu data.

Next, analysis/display apparatus 400 extracts radio parameters necessary to demodulate and decode the Uu data based on the Iub data and Iu data as radio parameter extraction processing (ST902).

Next, inspection apparatus 100 demodulates/decodes I/F data on the communication terminal apparatus to be inspected using the radio parameters and stores the acquired Uu data as radio data demodulation processing (ST903). For example, in the case that the control channel data transmitted at the downlink signal is acquired, it is necessary to acquire DRDCH as the physical channel, DCH as the transport channel and CCCH as the logical channel respectively. In this case, inspection apparatus 100 first demodulates DPDCH data by setting a scrambling code, channelization code, spreading factor of a specific base station apparatus, performs Viterbi decoding processing every time the number of symbols demodulated reaches 270 and decodes 270-bit data. Next, inspection apparatus 100 makes a CRC inspection using a 16-bit CRC code added to the DCH data, and extracts and stores a 246-bit DCH transport block if an error is not detected.

By repeating ST902 and ST903, the Uu data can be continuously acquired (ST904).

Finally, as comprehensive analysis processing (ST905), analysis/display apparatus 400 converts the Iub data and Iu data acquired through the data acquisition processing (ST901) and the Uu data acquired through the radio data demodulation processing (ST903) to message data and displays the message data arranged in a time series or in a sequence for each call.

An example of the message data sequence displayed at analysis/display apparatus 400 according to this embodiment will be illustrated below.

Figure 10:
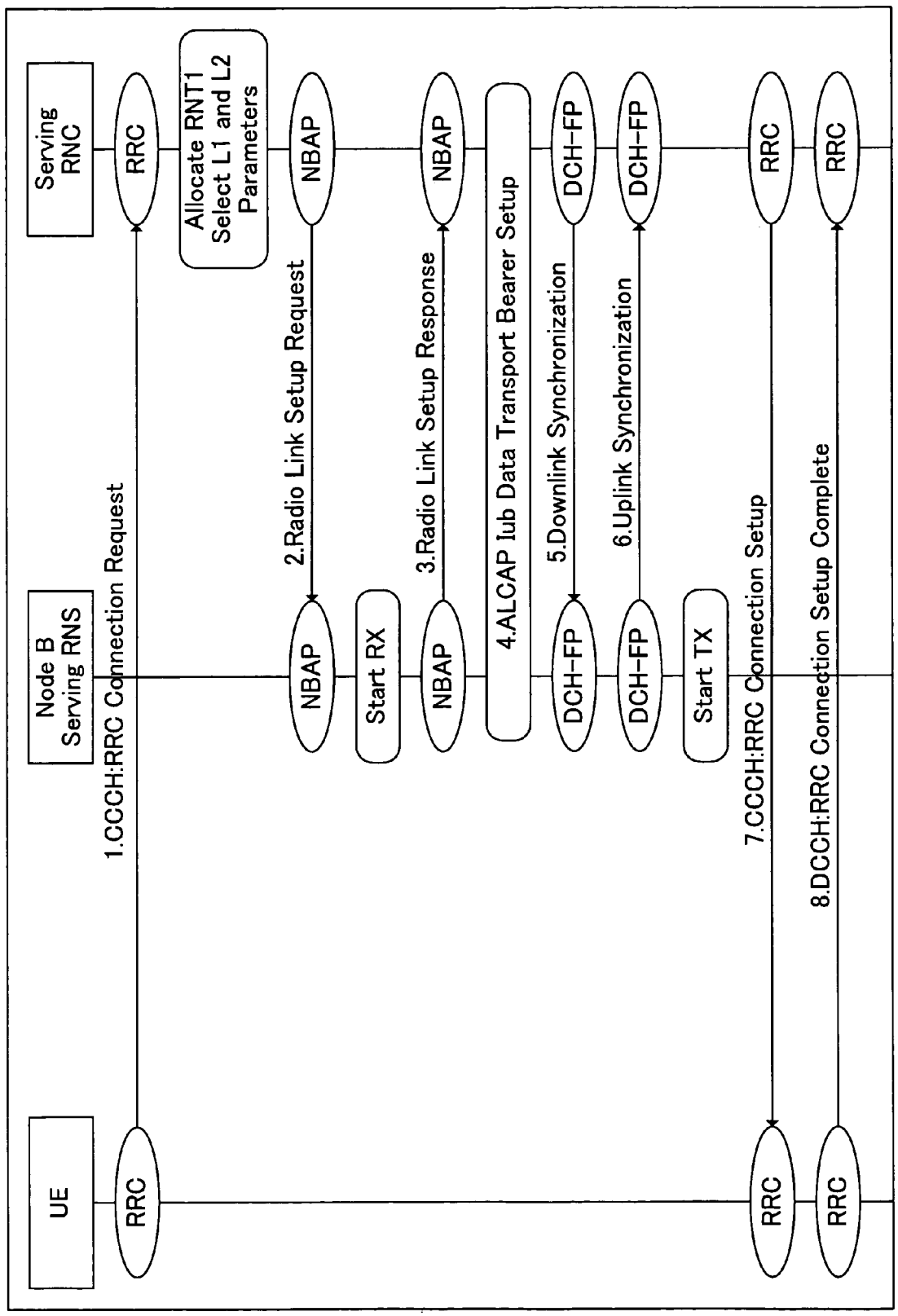
FIG. 10 shows a sequence for establishing DCH specified in 3GPP.

FIG. 10 illustrates a sequence for establishing a DCH (individual channel) stipulated in 3GPP (3rd Generation Partnership Project). FIG. 11 is an example of the sequence diagram displaying only messages of a conventional wired section (Iub) and shows a case where it is not possible to display "8. RRC Connection Setup" which should be received by the communication terminal apparatus even if it is analyzed. In this case, the user cannot specify whether this problem is caused by the transmission by the communication terminal apparatus or the reception by the base station apparatus or a poor propagation environment.

On the other hand, as shown in the sequence diagram displayed at analysis/display apparatus 400 according to this embodiment in FIG. 12, as a result of inspecting the radio section (Uu) together with the wired section (Iub) and displaying messages, the base station apparatus transmitted "8. RRC Connection Setup", whereas the base station apparatus did not receive the response thereto, "9. RRC Connection Setup Complete." Therefore, the user can specify that there is a problem in transmission/reception of messages from the communication terminal apparatus to the base station apparatus.

Figure 13:
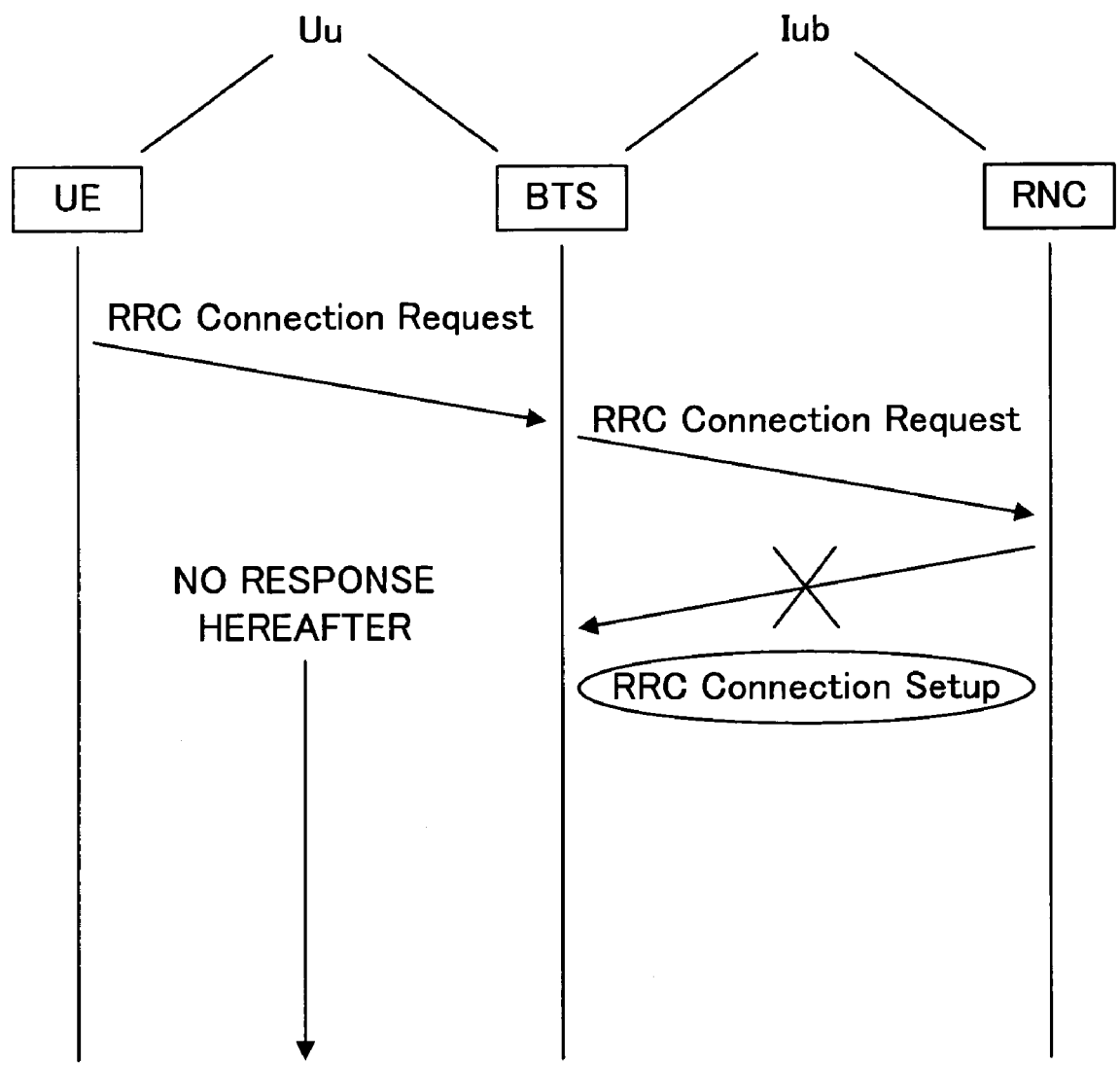
FIG. 13 is a sequence diagram displaying messages inputted to the analysis/display apparatus according to the embodiment of the present invention.

Furthermore, as shown in FIG. 13, as a result of inspecting the radio section (Uu) together with the wired section (Iub), in the case that it is not possible to display "RRC Connection Setup" which should be outputted from RNC and inputted to the base station apparatus even if it is analyzed, the user can specify that there is some failure on the network. When only the radio section is inspected, if a failure similar to that in FIG. 13 occurs, the user cannot specify whether or not the cause of the failure is in the base station apparatus or some failure on the network or that the inspection apparatus in the radio section could not receive the messages.

Furthermore, for the specific users, by comparing message data in the radio section and the wired section arranged in a time series, it is possible to acquire information necessary for optimization of the whole system such as specifying parts for requiring time to propagate a message or the like. For example, when messages in the radio section (Uu) and wired section (Iub) are displayed arranged in a time series as shown in the sequence diagram in FIG. 14, the user can specify that it takes time after the base station receives "RRC Connection Setup" from RNC until it transmits "RRC Connection Setup" to the communication terminal apparatus and processing by RNC has timed out. Furthermore, as a cause of a processing delay of the base station apparatus, an increase in the processing load may be considered so that the user can comprehensively estimate a bottleneck if the user demodulates signal exchanges with other communication terminal apparatuses and displays messages in a time series in a similar fashion. On the other hand, when only messages in the wired section (Iub) are displayed as in the conventional case, it seems to the user that there is no response from the communication terminal apparatus and the user cannot specify the failure.

Furthermore, displaying messages in the radio section together with the wired section is especially effective for a packet transmission scheme such as HSDPA (High-Speed Downlink Packet Access) where one physical channel is shared and used among a plurality of communication terminal apparatuses on a time-division basis.

According to HSDPA, a base station apparatus stores packet data transmitted from RNC, determines a destination communication terminal apparatus and transmission parameters by scheduling, transmits packet data and retransmits the packet data through H-ARQ (Hybrid-Automatic Repeat Request) control appropriately. When all packet data are transmitted, the base station apparatus sends a transmission completion response to RNC.

When only messages in the wired section (Iub and Iu) are displayed as in the conventional case, the user can detect only a time at which packet data is transmitted from RNC to the base station apparatus and a transmission completion response from the base station apparatus to RNC, and therefore the user cannot evaluate whether or not the behavior of the base station apparatus is right. For example, when it takes too much time from start to completion of transmission of packet data, the user cannot specify whether the cause is that the packet size is reduced because of poor communication quality or that retransmission frequently occurred or that there are some errors in the algorithm of the base station apparatus.

Furthermore, when only messages in the radio section (Uu) are displayed as in the conventional case, the user cannot see the communication state between the base station apparatus and a communication terminal apparatus other than that to be inspected, and cannot evaluate whether or not the behavior of the base station apparatus is right. For example, if the base station apparatus has transmitted packet data in only half the packet size it can transmit when the reception quality is good, the user cannot specify whether the cause is that the base station apparatus was also connected to the communication terminal apparatus other than that to be inspected and was transmitting packet data at the same time or that there are some errors in the algorithm of the base station apparatus.

On the other hand, it is possible to evaluate whether or not the behavior of the base station apparatus is right by displaying messages in the radio section together with the wired section. Moreover, by analyzing the retransmission frequency in the radio section during an inspection and the reception quality, it is possible to set a packet size that decreases the number of retransmissions and improves throughput, and provide optimization for the algorithm of the base station apparatus.

In this way, according to this embodiment, by extracting radio parameters from the wired data acquired through an inspection of the wired section, and can thereby acquire radio parameters in a short time and reliably, and easily inspect the radio section in an actual environment.

Moreover, by displaying wired messages and radio messages in a time series or in a sequence for each call, the user can easily specify a failure.

The case has been explained where two wired sections are inspected and both of the Iub data and Iu data are acquired in this embodiment, but the present invention is not limited to this and is also applicable to a case where any one of the Iub data and Iu data is acquired.

Here, for the purpose of preventing eavesdropping or the like, data transmitted/received in the radio section may be encrypted. The conventional technology of inspecting only the radio section (Uu) has no means for acquiring a key code for decryption, and the encrypted data therefore can be neither demodulated nor inspected.

However, the keycode for decryption is determined when the communication terminal apparatus is authenticated to the network and reported to RNC via ATM. Therefore, it is possible to inspect the wired section (Iu) and acquire the key code using the Iu data. Then, by using the key code in a MAC analysis by analyzer 411, it is possible to decrypt the encrypted data in the radio section.

In this way, according to this embodiment, it is possible to acquire the key code from the wired data acquired through an inspection of the wired section and thereby inspect encrypted data in the radio section.

The present application is based on Japanese Patent Application No. 2004-142094 filed on May 12, 2004, entire content of which is expressly incorporated by reference herein.

INDUSTRIAL APPLICABILITY

The present invention is suitable for use in an inspection apparatus and a monitoring system in a radio section.

The invention claimed is:

1. An inspection apparatus that inspects a radio section between a communication terminal apparatus and a base station apparatus, comprising:
   a radio parameter acquisition part that acquires at least one radio parameter parameters corresponding to a communication terminal apparatus to be inspected and acquired through an inspection of a wired section;
   a first receiving part that receives a radio signal transmitted from the communication terminal apparatus;
   a second receiving part that receives a radio signal transmitted from the base station apparatus;
   a radio parameter selector that selects at least one radio parameter corresponding to a receiving time of the radio signal received by the first receiving part and a receiving time of the radio signal received by the second receiving part, from among the at least one radio parameter acquired by the radio parameter acquisition part;
   a demodulator that demodulates the radio signals received by the first receiving part and the second receiving part, using the at least one radio parameter selected by the radio parameter selector; and
   a decoder that decodes the radio signals demodulated by the demodulator to acquire transport channel data.

2. An analysis/display apparatus comprising:
   an analyzer that analyzes the transport channel data decoded by the inspection apparatus according to claim 1 and converts the transport channel data to message data; and
   a display that displays the message data.

3. An inspection system comprising:
   a wired section inspection apparatus that inspects a wired section to acquire first transport channel data;
   a radio section inspection apparatus that inspects a radio section between a radio communication terminal apparatus to be inspected and a base station apparatus, using at least one radio parameter corresponding to the communication terminal apparatus acquired through the inspection of the wired section, to acquire second transport channel data; and
   an analysis/display apparatus that analyzes the first and second transport channel data acquired by the wired section inspection apparatus and the radio section inspection apparatus, to acquire message data, and displays the acquired message data arranged in a time series or in a sequence for each call;
   wherein the wired section inspection apparatus comprises:
   a first receiving part that receives a radio signal transmitted from the communication terminal apparatus;
   a second receiving part that receives a radio signal transmitted from the base station apparatus;
   a radio parameter selector that selects at least one radio parameter corresponding to a receiving time of the radio signal received by the first receiving part and a receiving time of the radio signal received by the second receiving part, from among the at least one radio parameter acquired through the inspection of the wired section;

a demodulator that demodulates the radio signals received by the first receiving part and the second receiving part, using the at least one radio parameter selected by the radio parameter selector; and a decoder that decodes the radio signals demodulated by the demodulator to acquire the second transport channel data.

4. The inspection system according to claim 3, wherein the analysis/display apparatus comprises:

an analyzer that analyzes the first transport channel data acquired by the wired section inspection apparatus and converts the first transport channel data to message data; and a radio parameter extractor that extracts radio parameters necessary to acquire the second transport channel data from the message data by said radio section inspection apparatus and outputs the extracted radio parameters to the radio section inspection apparatus.

5. The inspection system according to claim 4, wherein the analyzer analyzes the first transport channel data acquired by the wired section inspection apparatus, to acquire a key code for decryption, and decrypts the second transport channel data in the radio section using the acquired key code.

6. An inspection method comprising:

a data acquisition step of performing radio processing and analog-to-digital conversion processing on a radio signal received from a communication terminal apparatus and a radio signal received from a base station apparatus in a radio section between the communication terminal apparatus and the base station apparatus, to store data of the processed radio signals in a first memory, and acquiring first transport channel data exchanged in a wired section to store the acquired first transport channel data in a second memory;

a radio parameter extraction step of extracting at least one radio parameter based on the first transport channel data in the wired section;

a radio parameter selection step of selecting at least one radio parameter corresponding to a receiving time of the radio signals, from among the extracted at least one radio parameter;

a radio data demodulating step of demodulating/decoding the data stored in the first memory, using the selected radio parameter, to acquire second transport channel data in the radio section; and a comprehensive analysis step of converting the first and second transport channel data in the wired section and in the radio section to message data and displaying the message data arranged in a time series or in a sequence for each call.

* * * * *

UNITED STATES PATENT AND TRADEMARK OFFICE
CERTIFICATE OF CORRECTION

| | | |
|---|---|---|
| PATENT NO. | : 7,729,692 B2 | Page 1 of 1 |
| APPLICATION NO. | : 11/579957 | |
| DATED | : June 1, 2010 | |
| INVENTOR(S) | : Hitoshi Oka et al. | |

It is certified that error appears in the above-identified patent and that said Letters Patent is hereby corrected as shown below:

On the Title page, in field (57), under "Abstract", in column 2, line 10, delete "abase" and insert -- a base --, therefor.

In column 10, line 14, in Claim 1, after "parameter" delete "parameters".

In column 10, line 51, in Claim 3, delete "data" and insert -- data, --, therefor.

In column 12, line 22, in Claim 6, delete "data" and insert -- data, --, therefor.

Signed and Sealed this
Eighth Day of February, 2011

David J. Kappos
*Director of the United States Patent and Trademark Office*

UNITED STATES PATENT AND TRADEMARK OFFICE
CERTIFICATE OF CORRECTION

PATENT NO.         : 7,729,692 B2
APPLICATION NO.    : 11/579957
DATED              : June 1, 2010
INVENTOR(S)        : Hitoshi Oka et al.

It is certified that error appears in the above-identified patent and that said Letters Patent is hereby corrected as shown below:

On the Title page, in field (73), in "Assignees", in column 1, line 2, delete "Osaka (JP)" and insert -- Santa Clara, CA (US) --, therefor.

Signed and Sealed this
Sixteenth Day of August, 2011

David J. Kappos
*Director of the United States Patent and Trademark Office*